United States Patent Office 3,492,047
Patented Jan. 27, 1970

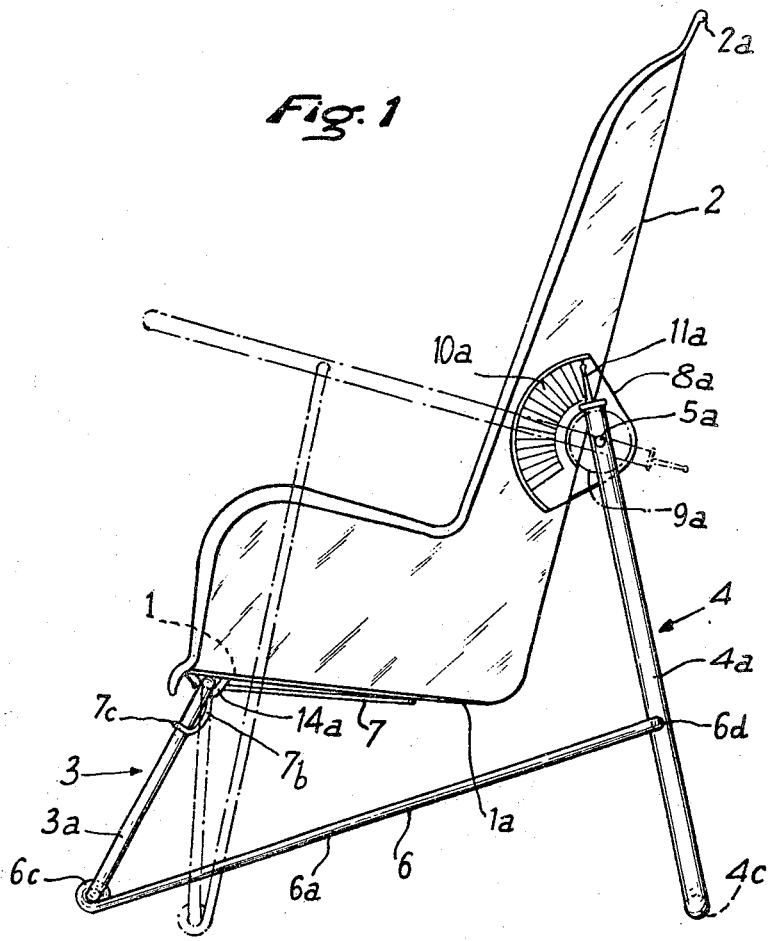
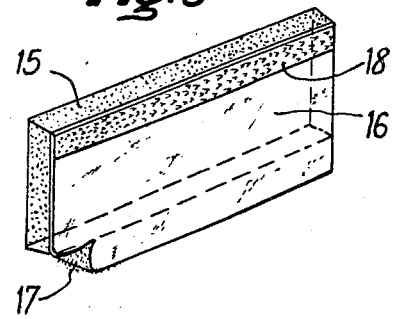
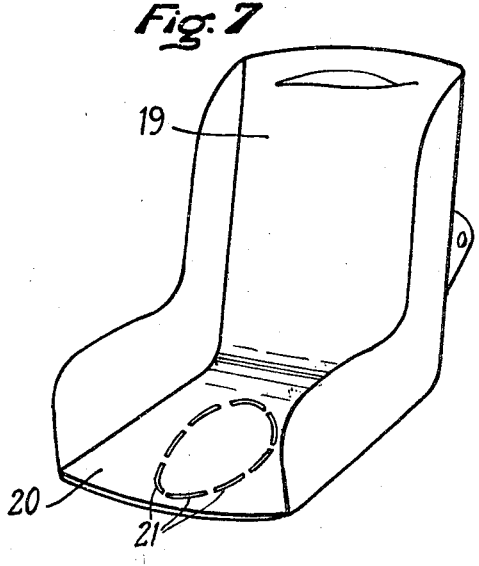

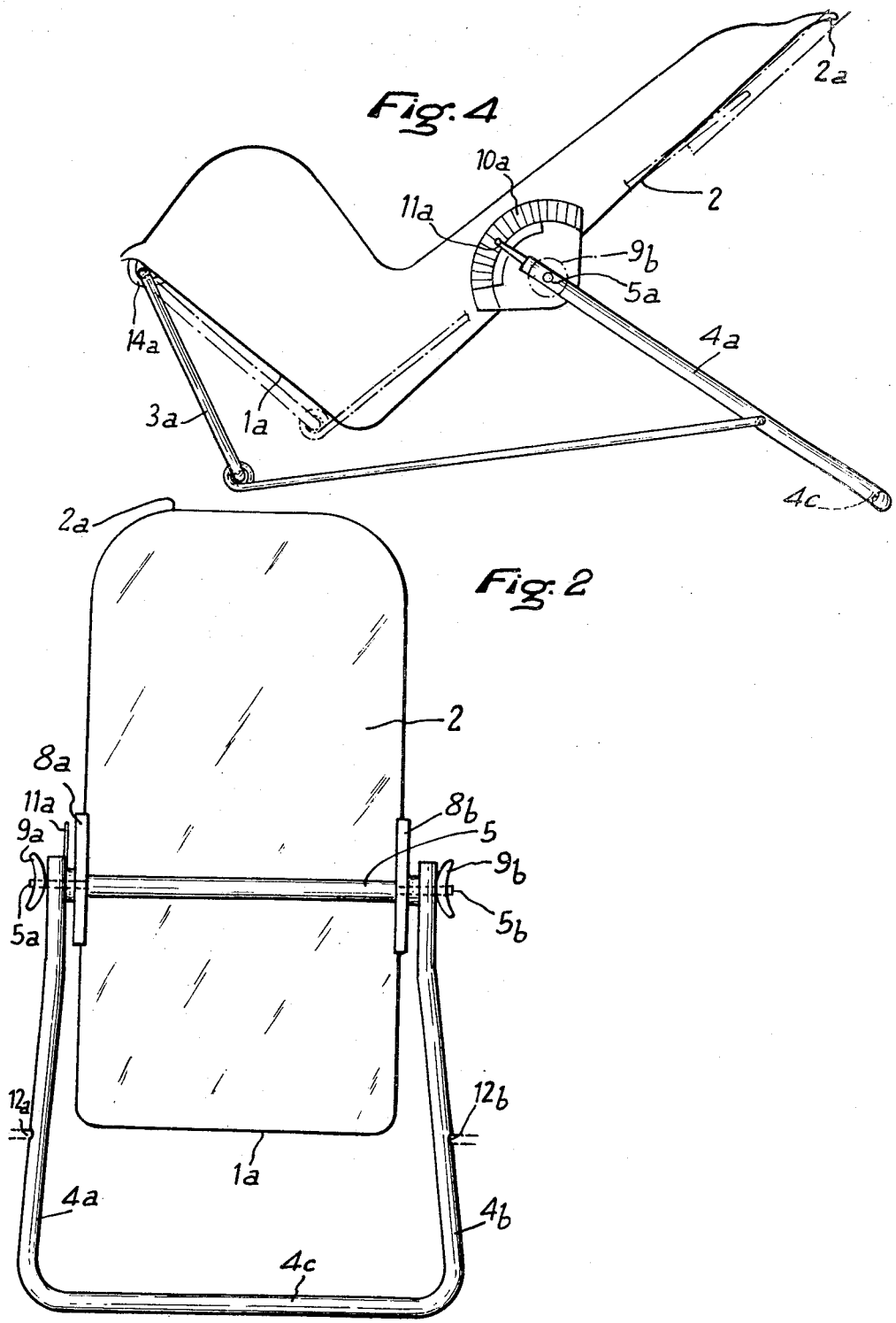

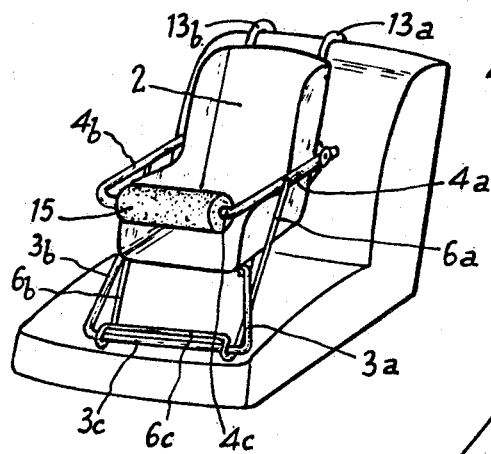
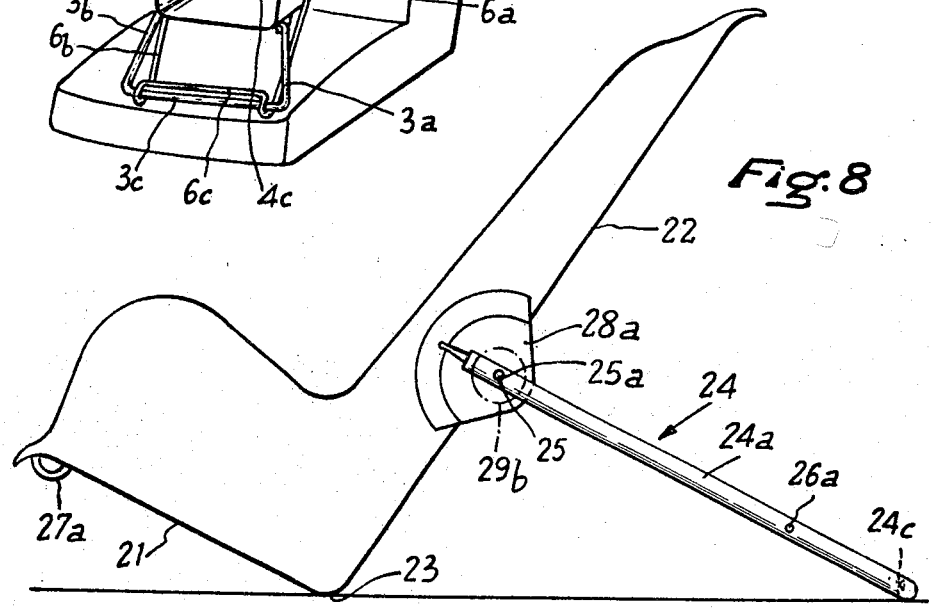
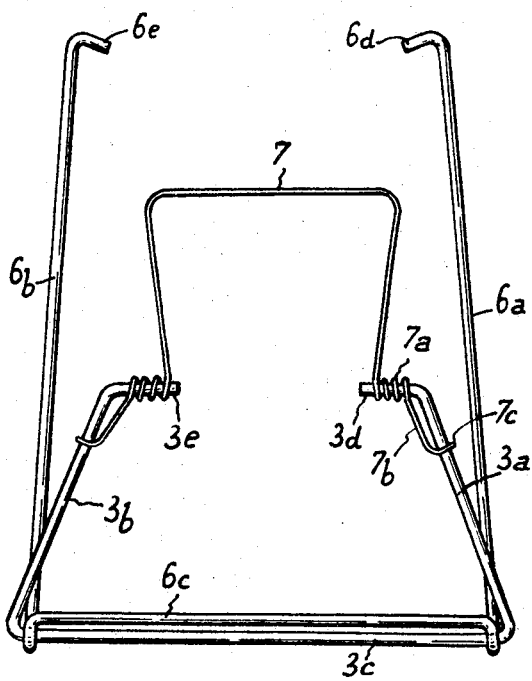

3,492,047
ADJUSTABLE BABY SEAT
Jean-Paul Antoine Dudouyt, Rte. d'Orx, Labenne, France
Filed Mar. 14, 1968, Ser. No. 713,063
Claims priority, application France, Mar. 17, 1967,
99,322
Int. Cl. A47c 1/02
U.S. Cl. 297—377         15 Claims

ABSTRACT OF THE DISCLOSURE

A baby's seat wherein the U-shaped front and rear feet carrying the actual seat are interconnected by a link forming with said feet and the actual seat a deformable system allowing the seat to assume any desired slope, said system being locked in the position corresponding to the desired slope. It is possible to make the rear foot pivot over the upper end of the seat back so that the cross-bar on said rear foot may then form a guard across the chest of the baby carried on the chair.

---

My invention has for its object a baby's seat provided with a support which allows the seat to assume a number of more or less sloping positions when it rests on the ground while it requires only a slight effort for adjusting and securing the seat in the position showing the selected slope.

My invention covers also, chiefly with a view to using it inside a conveyance, a baby's seat wherein a part of the support can be shifted without any dismantling towards the front of the seat into a position such that it prevents the baby from malling out either forwardly or laterally.

My invention has for a still further object a baby's seat wherein, for the position defined hereinabove that is for which a part of the support is shifted forwardly, a further part of the support forms a prop for the seat front.

According to another object of my invention, the baby's seat carries a reference scale which allows adjusting the seat without any hesitation to the desired slope taking into account the age of the baby or any special medical direction, while the seat may be held fast in a predetermined sloping position, for instance by means of a pivotal connection which may be clamped in the desired position.

My invention covers a baby's seat wherein the support includes a front foot and a rear foot constituted each by uprights which are stayed together and are pivotally secured through their upper ends respectively to the front and to the rear section of the seat, while said feet are pivotally interconnected by a link and slope-adjusting means are inserted between two of the different pivotally interconnected elements.

Further features of my invention will appear in the reading of the following description, reference being made to the accompanying drawings wherein:

FIG. 1 is a lateral elevational view of a seat according to my invention.

FIG. 2 is an elevational view, the seat being seen from the rear that is from the right-hand side of FIG. 1.

FIG. 3 is a view of the front foot and of its staying means.

FIG. 4 is a view similar to FIG. 1 of the seat in its rearwardly rocked position.

FIG. 5 is a view of the baby's seat when laid on the front seat of an automobile.

FIG. 6 is a view of the baby-protecting sleeve in its expanded condition.

FIG. 7 is a perspective view of a seat provided with an initiating cut adapted to form an opening engageable by a chamber pot, the support having been omitted in said figure for sake of simplicity.

FIG. 8 is a lateral elevation view of a simplified embodiment.

As illustrated in FIGS. 1 to 4, the baby's seat or armchair is constituted by a substantially rigid shell made for instance of plastics and including the actual seat 1 and a back 2. The support of the armchair comprises a front foot 3 and a rear foot 4. The front foot 3 includes two uprights 3a and 3b the lower ends of which are interconnected by a transverse cross-bar 3c. The upper end of each upright 3a, 3b is bent at 3e, 3d towards the plane of symmetry of the seat, so that said bent section may engage a hoop or ring such as that illustrated at 14a carried by the front section of the lower surface 1a of the actual seat 1. The rear foot 14 is similarly constituted by two uprights 4a, 4b the lower ends of which are interconnected by a cross-bar 4c while their upper ends are engaged transversely by the corresponding threaded ends 5a, 5b of a horizontal rod (FIG. 2) carried between and beyond two lugs 8a, 8b rigid with the rear surface of the back 2 and extending rearwardly. The feet 3 and 4 are pivotally interconnected by a link 6 including two lateral arms 6a, 6b the ends of which engaging the rear foot 4 are bent inwardly so that the bent sections 6d, 6e are adapted to enter perforations 12a, 12b (FIG. 2) formed in the corresponding uprights 4a, 4b, while the opposite ends of the arms 6a, 6b are bent so as to surround the cross-bar 3a forming part of the front foot 3 and terminate with a further cross-bar 6c (FIG. 3) interconnecting said arms 6a and 6b. The support forms thus a pivotal system with reference to the seat shell, which latter may assume any more or less rearwardly sloping position between the normal position illustrated in FIG. 1 and an almost horizontal position. In particular, it is possible to give it the position illustrated in FIG. 4.

For each sloping position the system is held fast in a conventional manner by tightening two knurled knobs 9a, 9b screwed over the threaded ends 5a, 5b of the spindle 5 outside the uprights 4a, 4b.

The upper end of the upright 4a carries an indicating hand 11a extending in alignment with said upright and adapted to move when the seat slope is changed in front of a scale-carrying sector 10a secured to the corresponding lug 8a rigid with the back 2. Such an arrangement allows adjusting without any difficulty the seat slope as required by the baby's age or by medical directions.

A steel wire 7 (FIG. 3) is folded into U-shape and extends beyond the end of each of its arms as a helical winding 7a forming a coil spring facing outwardly in a direction perpendicular to the medical line of symmetry of the U; each coil spring is adapted to be fitted over the bent section 3d or 3e of the corresponding upright 3a or 3b of the front foot 3 and extends furthermore into an outer rectilinear section 7b and thus the free terminal section of the steel wire as a hook 7c engaging said upright 3a or 3b. The transverse medical section of the U bears against the lower surface 1a of the bottom of the seat 1 and the whole arrangement is designed in a manner such that the position of equilibrium of the spring may correspond substantially to the upright position illustrated in FIG. 1. Said steel wire forms thus the means for urging the foot 3 forwardly into its normal position and consequently urging the whole support into said upright position illustrated in FIG. 1, as soon as the knurled knobs 9a, 9b have been released.

The length of the connecting link 6 is such that when the rear foot 4 is caused to rise through a pivotal movement around its pivotal axis formed by the rod 5 and to enter a position which is substantially parallel with the back 2 of the armchair, the lower cross-bar 3c of the front foot 3 which was formerly located underneath the seat collapses and enters a position close to the lower surface 1a of the actual seat 1. Said position is illustrated in dot-and-dash lines in FIG. 4 and allows the seat to be easily carried. Of course, a slightly less sloping position may also be used when carrying the seat, chiefly if a baby is resting on the seat.

The distance separating the cross-bar 4c forming part of the rear foot 4 from the pivotal connection of its upper end 5c is larger than the distance separating said pivotal connection 5c from the upper end 2a of the seat back. Said circumstance allows shifting the rear foot to the seat front into the position illustrated in dot-and-dash lines in FIG. 1, said foot having thus executed a pivotal movement over the upper end of the back so as to form a protecting guard protecting the baby against falling out forwardly.

FIG. 5 illustrates such a forwardly shifted position of the rear foot 4. The difference in length between the longitudinal parts of the links 6 and of the front foot is such that the cross-bar 4a of the rear foot 4 is located in front of the baby's chest when said front foot 3 lies thus in a position substantially perpendicular to the seat bottom. In FIG. 5, the seat set in the position which has just been described is shown as laid over the seat of an automobile, the back of the baby's armchair and the back of the seat being rigidly secured together in any known manner for instance by means of hooks 13a, 13b removably carried by the upper end of the back 2 of the baby's chair. A protecting sleeve 15 of polyvinyl sponge or the like surrounds the cross-bar 4c and serves for damping the shocks in the case of a possible throwing forward of the baby.

Said sleeve 15 is removable and constituted by a strip of polyvinyl sponge 15a illustrated in FIG. 6, said strip being provided along its longitudinal edges with cooperating connecting means. In the example illustrated, the strip 15a is glued over a piece of fabric 16 projecting beyond one of the longitudinal edges of said strip, its projecting section 17 carrying in a conventional manner hooks of synthetic material adapted to engage the fluffy section 18 on the free surface of the fabric 16 extending along the opposite edge of the strip.

In FIG. 7, there is illustrated a seat 19 similar to that described hereinabove but of which the support is not illustrated, said seat being provided in its bottom 20 with an initiating cut 21 defining the outline of an opening. The shape and size of said opening when the cut is complete are defined so as to be engaged by a chamber pot if required. It is sufficient to cut the bottom 20 along the initiating cut and to remove the section thus cut open.

Obviously the embodiment described hereinabove has been disclosed by way of example and in a non-limiting sense and the structure of the support, the arrangement of the pivotal connections and the clamping system in particular may be modified within the scope of the present invention as defined in the accompanying claims.

Thus, for instance, according to a simplified embodiment illustrated in FIG. 8, the support for the seat 22 is constituted solely by the rear foot 24 of the uprights 24a which are interconnected by a cross-bar 24c and are engaged transversely at their upper ends by the threaded ends 25a of a horizontal rod 25 carried between and beyond two lugs 28a rigid with the rear surface of the seat 22 and extending rearwardly. The rear foot 24 may be held fast with reference to the seat in any desired relative position by fastening the knurled knobs 29b. The pivotal connection between the rear foot and the horizontal rod is obtained either frictionally which allows the seat to be set in any desired position or else it is possible to resort to two notched discs which allow modifying the slope with reference to the seat back by a succession of angular shiftings by a few degrees of the movable disc with reference to the stationary disc. With the arrangement illustrated in FIG. 8, the seat rests on the ground through the rear portion 23 of its bottom 21. This provides a seat of an adjustable slope which is cheap and may be used as mentioned hereinabove so as to be carried, after bringing the foot 24 into parallelism with the seat, back through a pivotal movement directed upwardly and round its pivotal axis formed by the bar 25 and then rocking the foot 24 into its forward position over the seat back to the front of the latter. This leads to the obtention of a seat provided with a guard protecting the baby against falling out and which may be laid over the seat of an automobile. Of course, the uprights 24e forming part of the foot 24 of FIG. 8 may be provided each with a perforation 26a and the front section of the bottom 21 of the seat may be provided with two small loops 27a and thus the simplified seat may be readily transformed into a seat identical with that illustrated in FIGS. 1 to 4 through mere incorporation of the remainder of the pivotal system illustrated in FIG. 3 and including a front foot, a connecting link and possibly elastic means urging the system back into its upright position. It should be remarked that in all the embodiments disclosed, the length of the seat resting on the ground increases with the slope given to it, while its center is shifted rearwardly, which ensures a great stability for all the positions to be assumed by said seat.

What I claim is:

1. A baby's seat comprising a substantially rigid seating shell including a bottom and a back and a support including a rear foot and a front foot including each two uprights the upper ends of which are pivotally connected respectively to the front of the bottom and to the rear of the back and a cross-bar staying and interconnecting the lower ends of the uprights, a connecting link system pivotally connecting the front foot with the rear foot and means locking the pivoting system constituted by the shell and support in any desired angular setting of its component parts.

2. A baby's seat as claimed in claim 1, wherein the link system includes two arms the front ends of which engage pivotally the lower ends of the corresponding uprights of the front foot and the rear ends of which are pivotally secured to points at a predetermined height of the corresponding uprights of the rear foot.

3. A baby's seat as claimed in claim 1, wherein the link system includes two arms the front ends of which engage pivotally the lower ends of the corresponding uprights of the front foot and the rear ends of which are pivotally secured to points at a predetermined height of the corresponding uprights of the rear foot, and a further cross-bar interconnecting the two arms of the link system.

4. A baby's seat as claimed in claim 1, wherein the link system extends in a longitudinal direction of the seat over a length substantially equal to the length of the shell back between its lower end and the pivotal connection between said back and the rear foot plus the length of said rear foot whereby, upon folding of the rear foot over the part of the back extending above the pivotal connection between said back and said rear foot, the front foot is collapsed into substantial registry with the underside of the shell bottom.

5. A baby's seat as claimed in claim 1, wherein the length of the rear foot between its cross-bar and its pivotal connection with the shell back is larger than the length of the back between said pivotal connection and the upper end of said back.

6. A baby's seat as claimed in claim 1, wherein the length of the rear foot between its cross-bar and its pivotal connection with the shell back is larger than the length of the back between said pivotal connection and the upper end of said back, and wherein the difference between the lengths measured in a longitudinal direction with reference to the seat, of the front foot between its pivotal connections with the shell bottom and the link system and of the link system between its connections with the front and with the rear foot is such as to set the cross-bar of the rear foot in front of the location of the chest of a baby carried in the shell when the rear foot is caused to pivot forwardly over the upper end of the back with the front foot in a substantially vertical position.

7. A baby's seat as claimed in claim 1, wherein the cross-bar of the rear foot is adapted to be set in front of the baby in the shell, as provided by a pivotal forward movement of the rear foot, said seat comprising a protecting deformable sleeve fitted on last-mentioned crossbar to protect the baby against shocks urging it forwardly.

8. A baby's seat as claimed in claim 1, wherein the cross-bar of the rear foot is adapted to be set in front of the baby in the shell as provided by a pivotal forward movement of the rear foot, said seat comprising a protecting deformable sleeve fitted on last-mentioned crossbar to protect the baby against shock urging it forwardly, said sleeve being constituted by a cylinder made of a strip of material the longitudinal edges of which are removably interconnected.

9. A baby's seat as claim in claim 1, comprising slope-indicating means including a scale and a hand cooperating with said scale, said scale and hand being carried by two pivotally interconnected elements of said seat.

10. A baby's seat as claimed in claim 1, comprising a horizontal rod carried by the rear surface of the back and forming part of the pivotal connection between the back and the rear foot and a lug rigid with the back at each end of the rod and extending rearwardly to guide the upper ends of the uprights of the rear foot.

11. A baby's seat as claimed in claim 1, comprising a horizontal rod carried by the rear surface of the back and forming part of the pivotal connection between the back and the rear foot, a lug rigid with the back at each end of the rod and extending rearwardly as a guide for the upper ends of the uprights of the rear foot, a scale-carrying sector rigid with one of said lugs and a slope indicating hand cooperating with said scale and carried by the upper end of the corresponding upright of the rear foot.

12. A baby's seat as claimed in claim 1, comprising elastic means interconnecting the shell bottom with the front foot and urging same into a relative position for which the shell bottom resting on its feet is substantially horizontal.

13. A seat as claimed in claim 1, wherein the upper ends of the uprights of the front foot are turned inwardly in a transverse direction to form pivots, said seat comprising a spring wire the medial portion of which engages the underside of the shell bottom and the legs of which are turned outwardly to form coil springs surrounding last-mentioned pivots, each of said coil springs terminating with a rectilinear section the outer end of which forms a hook engaging the corresponding upright.

14. A baby's seat as claimed in claim 1, wherein the seat is provided with an initiating cut which when complete forms an opening for the insertion of a chamber pot.

15. A baby's seat as claimed in claim 1 with the omission of the front feet and connecting link system.

References Cited

UNITED STATES PATENTS

| | | | |
|---|---|---|---|
| 1,865,030 | 6/1932 | McCauley. | |
| 2,182,516 | 12/1939 | Coble | 297—377 XR |
| 2,308,315 | 1/1943 | Smith | 297—377 XR |
| 2,834,032 | 5/1958 | Scott | 297—377 XR |
| 2,954,567 | 10/1960 | Abajian | 297—377 XR |
| 3,206,247 | 9/1965 | Johnson | 297—377 XR |

BOBBY R. GAY, Primary Examiner

G. O. FINCH, Assistant Examiner

UNITED STATES PATENT OFFICE
CERTIFICATE OF CORRECTION

Patent No. 3,492,047          Dated January 27, 1970

Inventor(s) Jean-Paul Antoine Dudouyt

It is certified that error appears in the above-identified patent and that said Letters Patent are hereby corrected as shown below:

Claim 1, line 3 "rear" should read -- front -- and "front" should read -- rear -- .

Claim 15, line 2, "feet" should read -- foot -- .

Signed and Sealed this

Fifth Day of April 1977

[SEAL]

Attest:

RUTH C. MASON
Attesting Officer

C. MARSHALL DANN
Commissioner of Patents and Trademarks